US009848157B2

(12) United States Patent
Stevens

(10) Patent No.: US 9,848,157 B2
(45) Date of Patent: Dec. 19, 2017

(54) METHOD OF AUTOMATICALLY SWITCHING TELEVISION CHANNELS

(75) Inventor: Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 2014 days.

(21) Appl. No.: 11/846,069

(22) Filed: Aug. 28, 2007

(65) Prior Publication Data

US 2009/0064221 A1    Mar. 5, 2009

(51) Int. Cl.
| | |
|---|---|
| H04N 5/445 | (2011.01) |
| H04N 5/50 | (2006.01) |
| H04N 5/765 | (2006.01) |
| H04N 21/262 | (2011.01) |
| H04N 21/426 | (2011.01) |
| H04N 21/44 | (2011.01) |
| H04N 21/442 | (2011.01) |
| H04N 21/6543 | (2011.01) |
| H04N 21/81 | (2011.01) |
| H04N 5/775 | (2006.01) |

(52) U.S. Cl.
CPC ............... *H04N 5/50* (2013.01); *H04N 5/765* (2013.01); *H04N 21/26291* (2013.01); *H04N 21/4263* (2013.01); *H04N 21/44008* (2013.01); *H04N 21/44245* (2013.01); *H04N 21/6543* (2013.01); *H04N 21/814* (2013.01); *H04N 21/8146* (2013.01); *H04N 5/775* (2013.01)

(58) Field of Classification Search
CPC ................ H04N 21/4408; H04N 21/4263
USPC ..................................... 725/38, 59
See application file for complete search history.

(56) References Cited

U.S. PATENT DOCUMENTS

| | | | |
|---|---|---|---|
| 5,900,916 A * | 5/1999 | Pauley ............................. | 725/59 |
| 6,052,145 A * | 4/2000 | Macrae et al. .................. | 725/50 |
| 6,839,901 B1 * | 1/2005 | De Saint Marc et al. ...... | 725/32 |
| 7,089,575 B2 * | 8/2006 | Agnihotri et al. .............. | 725/20 |
| 7,383,563 B1 * | 6/2008 | Rashkovskiy ................... | 725/58 |
| 2002/0029386 A1 * | 3/2002 | Robbins .......................... | 725/56 |
| 2002/0059637 A1 * | 5/2002 | Rakib ............................ | 725/119 |
| 2002/0157101 A1 * | 10/2002 | Schrader et al. ............... | 725/64 |
| 2003/0043789 A1 * | 3/2003 | Okajima et al. ............... | 370/360 |
| 2004/0034873 A1 * | 2/2004 | Zenoni ............... | H04N 7/17318 725/135 |
| 2005/0044570 A1 * | 2/2005 | Poslinski ......................... | 725/48 |
| 2005/0138659 A1 * | 6/2005 | Boccon-Gibod et al. ...... | 725/58 |
| 2006/0037044 A1 * | 2/2006 | Daniels ........................... | 725/39 |
| 2006/0177197 A1 * | 8/2006 | Nakamura et al. ............. | 386/83 |
| 2006/0179462 A1 * | 8/2006 | Willame et al. ................ | 725/90 |
| 2006/0200842 A1 * | 9/2006 | Chapman et al. .............. | 725/34 |
| 2008/0066106 A1 * | 3/2008 | Ellis et al. ...................... | 725/40 |
| 2008/0066111 A1 * | 3/2008 | Ellis et al. ...................... | 725/57 |
| 2008/0077959 A1 * | 3/2008 | Kirimura et al. .............. | 725/46 |
| 2008/0155636 A1 * | 6/2008 | Cruz et al. .................... | 725/131 |

(Continued)

*Primary Examiner* — Junior Mendoza
(74) *Attorney, Agent, or Firm* — Great Lakes Intellectual Property, PLLC.

(57) ABSTRACT

Method for automatically switching television channels or other content sources. The method may be used with any electronic media to facilitate switching between channels or other content sources based on events or other occurrences in non-viewed channels, such as but not limited to switching channels based on sporting event occurrences (goals, ending of game, etc.), news event occurrence (breaking news, health tips, etc.), and other any number of other identifiable events.

1 Claim, 1 Drawing Sheet

(56) References Cited

U.S. PATENT DOCUMENTS

2008/0168500 A1* 7/2008 Carlson et al. ................. 725/46
2008/0320513 A1* 12/2008 Wong et al. .................... 725/38
2017/0127143 A1* 5/2017 Knudson ............ H04N 21/4886

* cited by examiner

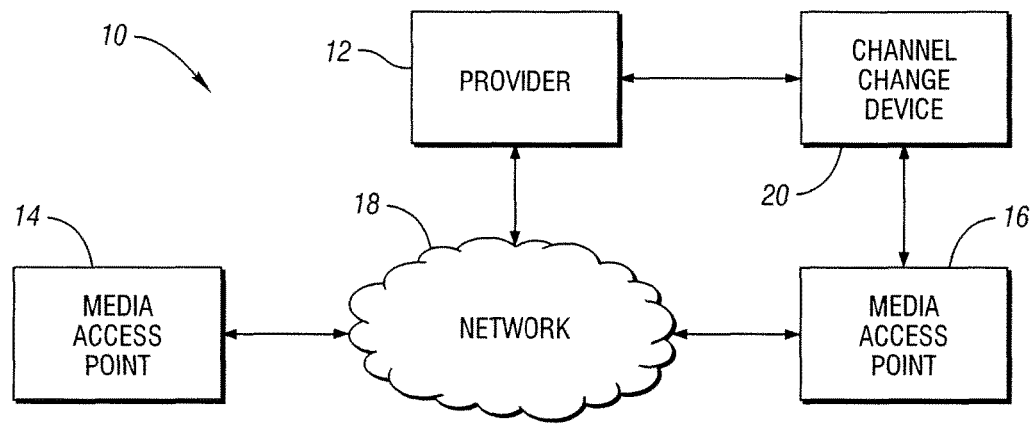
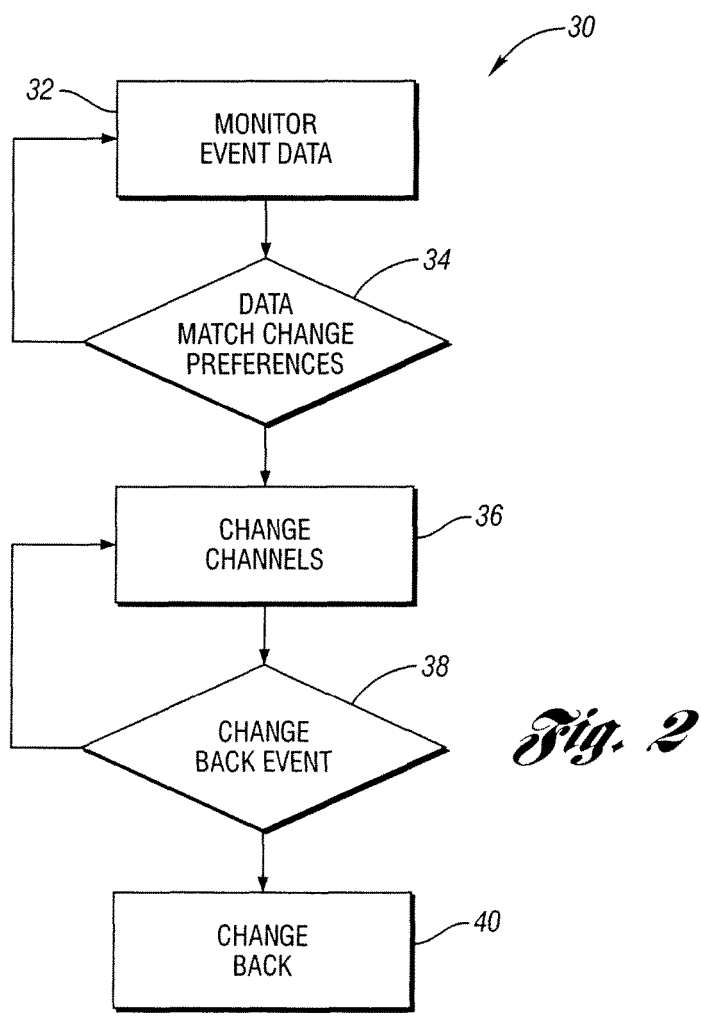

US 9,848,157 B2

1

METHOD OF AUTOMATICALLY SWITCHING TELEVISION CHANNELS

BACKGROUND OF THE INVENTION

1. Field of the Invention

The present invention relates to methods and systems associated with automatically switching between multiple television channels or content sources based on events occurring in a non-viewed channel or content source.

2. Background Art

Television viewers are often interested in monitoring events occurring on different channels, such as if a viewer is interested in watching multiple sporting events showing on different channels. In order to keep up with the event of each sporting event, the viewer is required to periodically switch between the channels, i.e., from a viewed channel to a non-viewed channel, by manually actuating a remote control or other channel change device. When the viewer switches channels, the current events on the switched to channel may not apprise the viewer of the latest events, such as if the channel is changed during a commercial event or after occurrence of a significant event (touchdown, goal, stock price change, etc.). Accordingly, a need exists to allow viewers to switch between channels while events of interest are showing on the switch to channel.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a system for automatically switching channels or content sources in accordance with one non-limiting aspect of the present invention; and FIG. 2 illustrates a flowchart for a method of automatically switching television channels in accordance with one non-limiting aspect of the present invention.

DETAILED DESCRIPTION OF THE PREFERRED EMBODIMENT(S)

FIG. 1 illustrates a system 10 for automatically switching channels or content sources in accordance with one non-limiting aspect of the present invention. The system 10 generally applies to any environment where content associated with a provider 12 may be delivered to and between multiple media access points 14-16 having features to facilitate interfacing the media with a user or other entity. The system 10 may be adapted to any number of environments and configured to carry or otherwise facilitate any type of electronically transmissible media having content. The media may be transmitted over a network 18 or other communication medium (portable memory, etc.) having capabilities sufficient to deliver the media from one location to another.

The provider 12 may be associated with any type of media provider having capabilities to transmit media and/or any number of affiliated or non-affiliated content sources having capabilities to transmit content to the access points 14-16. For exemplary purposes only and without intending to limit the scope and contemplation of the present invention, the content source may be associated with a multiple system operator (MSO) or other entity associated with providing services to any number of subscribers by way of any number of media access points. Such MSO's may include but are not limited to cable, satellite, or broadcast television service providers, communication or cellular providers, internet service providers (data), and the like.

The network 18 may be associated with any type of network and include any combination of wireline and/or wireless features and devices to facilitate the electronic transmission of media. The network may include multiple connection points and devices to facilitate media transmission, including but not limited to transmissions occurring through fixed media (CDs, DVDs, portable memory) and transmissions over electronic networks, such as but not limited to wireline and wireless networks. The network is intended to represent a method of transferring electronic media (portable memory) and/or an infrastructure for transferring electronic media (wireline/wireless network).

The access points 14-16 may be associated with any type of access point suitable for interfacing the media with the user and/or otherwise processing the media for subsequent use. The access point may include but is not limited to a settop box (STB), digital video recorder (DVR), personal computer (PC), television (which may include embedded user interface, conditional access, and/or other processing capabilities), outlet digital adapter (ODA), media access point adapter (MTA), cable modem (CM), personal digital assistant (PDA), computer, mobile device (phone, computer, etc.), personal media device, audio/video player, and/or any other feature having capabilities for processing media.

The system 10 may further include a channel change device 20. The channel change device 20 may be configured in accordance with the present invention to facilitate automatically changing a channel or other content source accessed through a device at one of the media access points 14-16. For exemplary purposes only and without intending to limit the scope and contemplation of the present invention, operation of the channel changing device 20 is predominantly described with respect to changing a television channel tuned to by a STB associated with a television at the media access point. The present invention fully contemplates automatically switching television channels or other content sources in any other manner, and not necessarily through issuing instructions to an STB tuned to different channels.

In operation, the channel change device 20 may be configured to monitor live event data generated proximate in time to live events occurring in a number of programs showing on a number of television channels being broadcasted in real-time from the provider. The live event data may be metadata or other forms of data associated with the events occurring in the various programs. The event data may be continuously updated to reflect ongoing changes in the programs, such as but not limited to reflecting score changes or other significant events occurring during a sporting broadcast showing on one or more of the channels.

The live event data used to track and otherwise monitor the events showing on the channels can be determined from any number of sources. The live event data may be determined from closed-caption data included with broadcasting of the programs showing on the various channels. The closed-caption data may be determined in real time by a user typing in dialogue and other information associated with the events occurring within the program. The live event data may also be determined from other data entered manually during the showing of the program by a system operator. This may include having a dedicated system operator that enters specific event codes or other instructions upon occurrence of particular events occurring within the programs, instead of slavishly recited dialogue and other non-eventful information. This short-hand method of tracking the events may be advantageous over the closed-caption data in that it requires less processing and monitoring of the event data. Of course, any other method can be used to generate the data without deviating from the scope and contemplation of the present invention, including computers or artificial intelligent systems that may be able to automatically generate non-predetermined metadata after an event has occurred, i.e., after a score in a sporting event.

The channel change device 20 may issue instructions to facilitate taking a number of other actions based on the live event data, including issuing instructions to the STB for switching the STB from a viewed channel to a non-viewed channel as a function of the live event data. Optionally, the television channel change device may include a number of channel change event preferences for subscribers associated with the provider. The channel change event preferences may specify differing events of interest to the subscriber that may be used to determine whether the subscriber would desire to switch to another channel based on the events occurring in that channel while the viewer is watching another channel.

If the media access point or a device in communication therewith includes capabilities to record or tune to multiple channels, the channel change device 20 may be configured to execute additional operations besides simply switching the STB from one channel to another. This may include, for example, engaging the recording device to record a portion of the program showing on the non-viewed channel prior to switching to the non-viewed channel so that the event showing prior to switching to the non-viewed channel can be viewed by the viewer. This may be particularly advantageous since the live event data may be generated after the event of interest has occurred such that even the fastest channel switching may necessarily switch after the event of interest has expired.

This type of operation might require that the STB or other device associated with the access point, such as a network based recording element or VOD system, to include capabilities to view one channel and record or pause a program showing on another non-viewed channel. The recording device may also be configured and/or instructed by the channel change device to record the program showing on the viewed channel after the channel is changed to the non-viewed channel. This can be advantageous in allowing the user to switch back to the previously viewed channel and review events that may have occurred while tuned to the non-viewed channel.

Optionally, the channel change preferences may specify the non-viewed channel being recorded while another channel is being viewed. The channel change preferences may further specify a number of non-viewed channels to be recorded while the viewed channel is being viewed so that the channel can be changed to any one of the recorded channels. To limit the recording time and space needed to record a non-viewed channel, the content showing on the non-viewed channels may be buffered for a limited period of time, such as but not limited to a period of time sufficient to rewind the program to a period in time before the occurrence of the events prompting the channel change.

In addition to switching and recording channels, the channel change device 20 may issue instructions to facilitate taking a number of other actions, such as but not limited to switching the channel showing in a picture-in-picture window on the television. The picture-in-picture application may include a larger window within the television shown one channel and a smaller window showing another channel. The channel change device 20 may be configured to swap the channel showing in the larger window with the channel showing in the smaller window, to change the channel showing in either one of the windows, and/or to switch both of the primary and secondary channels showing on the television.

The instructions issued from the channel change device 20 may be communicated to the access point 14-16, or more particularly to the device used to descramble the television signals or otherwise facilitate access to the content from the provider, over the network 18 or through other means. This may include the channel change device 20 issuing instructions from a headend associated with the provider through out-of-band messaging or other cable based network communication strategies for receipt by the STB. These instructions may be directly received by the television or STB, i.e., the device making the channel change.

The channel change device 20 may also issue instructions over an intermediary device by way of instructions carried over a high speed data network or other data based network for communication to the STB. For example, the present invention contemplates an application where wireless signals may be communicated to the STB from an intermediary device connected to a home network of the subscriber located at the media access point, such as but not limited to a computer having a wireless or IR blaster. This application may include communicating at least a portion of the channel change instructions over the home network, data network or other network in communication therewith for receipt by the computer or other device connected to the home network and located remotely from the STB. This device upon receipt of the instructions, can then issue a wireless signal for receipt by the STB.

FIG. 2 illustrates a flowchart 30 for a method of automatically switching television channels in accordance with one non-limiting aspect of the present invention. The method is described with respect to switching television channels for illustrative purposes only. The present invention fully contemplates switching between any content source, and not just television channels, such as switching between audio sources, internet events (webpages), instant messages (text), etc. The method may operate with any system used to provide electronic media to one or more subscribers, such as but not limited the above-described cable television system.

Block 32 relates to monitoring live event data for content available on a number of television channels. The live event data may be generated from closed-captioned data, system operator comments, or through any other source having capabilities to reflect ongoing changes in the programs showing on the various television channels or other live or non-predefined events associated with other content sources, such as but not limited to instant messages, home alarm events, etc. The live event data may be different from data normally included for television programs, sit-coms, sporting events in so far as the live event data may be determined as the program is being broadcasted, i.e., after the events have occurred, as opposed to being canned information determined prior to broadcasting. Or course, the event data may include predefined information, such as commercial markers and other indicators of known or pre-determinable events that may be appropriate for switching channels.

Block 34 relates to determining whether the event data matches with channel change preferences for a particular viewer watching television. The channel change preferences may specify switching channels for any number of reasons. One preference may relate to switching channels during sporting events, such as switching channels upon a goal being scored, a lead change, a time period expiration (quarter about to end, etc.). One preference may relate to switching channels during news broadcasts, such as switching channels when particular news items are being discussed, like stock prices, health tips, etc. One preference may relate to switching channels during commercials, such as switching back to a previously viewed channels once commercials showing on that channel are completed.

Block 36 relates to changing channels upon matching the live event data with the channel change preferences. The channel change may be executed in any suitable manner, including communicating channel changes signals to the television (STB) from a headend unit or indirectly by way of wireless signals communicated from a device connected to a home network, i.e., a device not connected to the television. The channel changes preferences may also specify taking other action. These actions may include swapping channels showing in a picture-in-picture window, coordinating recording of content showing in viewed and non-viewed channels, and any number of other operations associated with facilitating channel switching so as to allow the viewer to view non-viewed content of interest.

Blocks 38-40 relate to determining and executing change back events after the channel has been changed due to a previous channel change event. The channel change preference may include information regarding the change back events. This may include switching back to the previously tuned to channel. This may include switching back to the previously viewed channel after the event of interest has been watched. A timing feature may be included to time the event of interest for coordinating channel switch back and/or the ending of the event of interest may be determined from the live event data associated therewith. The change back event may also include rewinding a recording of the previously viewed channel to view content shown on the channel while viewing another channel.

One non-limiting aspect of the present invention may relate to a system and method that may use live metadata to initiate a channel change or selection of live content for viewing based on events registered by a user. (For example, tune to a particular sporting even when a team scores.) This may include a computer or set-top-based controller that allows the user to register for events of interest in order to set content selection criteria. The computer or other controller with remote control capability (IP-based or infrared) may be used to switch to a particular channel or content source based on live event metadata. This may include a DVR and instructing the DVR to pause the current programming being interrupted to replace it with the programming associated with the event of interest. The monitoring may be done offline by a separate computing device (such as a computer connected to the Internet).

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A non-transitory computer-readable medium having a plurality of non-transitory instructions, which when executed with a processor of a controller, are sufficient to facilitate switching between a plurality of television channels used to deliver a plurality of television programs, the non-transitory instructions being sufficient for:

wirelessly instructing a television with signals carried over a wireless network to tune to a first television channel of the plurality of television channels for playback of a first program of the plurality of programs to a viewer;

determining a one or more of the plurality of television channels desired for recording based on user inputs manually input by the viewer to the controller while the television is tuned to the first television channel to facilitate viewing of the first program;

while the first program is being viewed, wirelessly instructing the television with signals carried over the wireless network to generate a recording of a second television channel of the plurality of television channels corresponding with the one or more of the plurality of television channels desired for recording such that the recording records a second program of the plurality of programs while unviewed by the viewer;

monitoring event coding included within the second television channel to identify a plurality of events occurring in the second program while the first program is being viewed and the second program is being unviewed by the viewer, the event coding being different from and independent of closed-captioning included within the second television channel to identify the plurality of events;

determining one of the plurality of events to be associated with a tuning event specified by the viewer with user inputs manually input by the viewer to the controller while the first program is being viewed;

instigating a tuning operation after determining occurrence of the tuning event within the second program while the first program is being viewed and the second program is being unviewed, the tuning operation occurring after a first event at a beginning of the second program and prior to a last event at an ending of the second program such that the tuning operation occurs after the beginning and prior to the ending of the second program, the tuning operation including:

i) wireless instructing the television with signals carried over the wireless network to cease playback of the first program to the viewer;

ii) wireless instructing the television with signals carried over the wireless network to rewind the recording to a point in the recording occurring before occurrence of the tuning event; and iii) wireless instructing the television with signals carried over the wireless network to playback the recording beginning at the point.

* * * * *